United States Patent
Konishi et al.

(10) Patent No.: US 6,182,709 B1
(45) Date of Patent: Feb. 6, 2001

(54) UNCOATED WOVEN FABRIC FOR AIR BAGS, AND ITS PRODUCTION PROCESS AND SYSTEM

(75) Inventors: Tatsuo Konishi; Mamoru Kitamura, both of Otsu (JP)

(73) Assignee: Toyo Boseki Kabushiki Kaisha, Osaka (JP)

( * ) Notice: Under 35 U.S.C. 154(b), the term of this patent shall be extended for 0 days.

(21) Appl. No.: 09/359,456

(22) Filed: Jul. 22, 1999

(30) Foreign Application Priority Data

Jul. 27, 1998 (JP) .................................................. 10-211086

(51) Int. Cl.<sup>7</sup> ....................................................... D03D 1/04
(52) U.S. Cl. ............................................. 139/389; 139/1 R
(58) Field of Search ..................................... 139/1 R, 389, 139/291 R; 428/36.1

(56) References Cited

U.S. PATENT DOCUMENTS

| 5,477,890 | 12/1995 | Krummheuer et al. . |
| 5,581,856 | 12/1996 | Krummheuer et al. . |
| 5,650,207 | 7/1997 | Crouch . |

FOREIGN PATENT DOCUMENTS

| 0636721 | 7/1990 | (EP) . |
| 0453678 | 10/1991 | (EP) . |
| 0436950 | 2/1995 | (EP) . |
| 98/00592 | 1/1998 | (WO) . |

Primary Examiner—John J. Calvert
Assistant Examiner—Robert H. Muromoto, Jr.
(74) Attorney, Agent, or Firm—Leydig, Voit & Mayer, Ltd.

(57) ABSTRACT

An uncoated woven fabric for air bags of motor vehicles which is produced by weaving a fabric; subjecting the woven fabric to a shrinkage step in boiling water; and then subjecting the woven fabric thus treated to a step for drying and finishing.

15 Claims, 1 Drawing Sheet

UNCOATED WOVEN FABRIC FOR AIR BAGS, AND ITS PRODUCTION PROCESS AND SYSTEM

BACKGROUND OF THE INVENTION

1. Field of the Invention

The present invention relates to air bags which are one of safety devices of motor vehicles. More specifically, the present invention is intended to provide an uncoated woven fabric for air bags of motor vehicles, which has suitably adjusted air-permeability, and is particularly soft and lightweight in addition to excellent in compactness, by an economical production process with maintaining required mechanical properties. The present invention also relates to the production process and system of the uncoated woven fabric.

2. Disclosure of the Prior Art

As users' safety consciousness has risen, recently, the number of motor vehicles fitted with air bags as one of their safety parts has rapidly increased. Air bags serve as protection of users of motor vehicles including drivers and passengers against traffic accidents such as collisions. For example, upon a collision, a sensor perceives impact, thereby actuating an inflator to generate gas at high pressure and temperature, followed by rapid deployment of an air bag which has been folded and stored in an appropriate part of a motor vehicle such as a steering wheel, an instrument panel, a recess in the door frame, etc., to protect the user against the collision.

Heretofore, woven fabrics coated with synthetic rubber such as chloroprene, chlorosulfonated olefin, silicone and the like have been used for air bags from the viewpoints of heat resistance, air barrier properties (air-permeability) and fire and flame retardancy.

However, these coated fabrics have many drawbacks such as increase in weight and decrease in pliability of fabrics, increase in production costs, difficulty in recycling, and the like. At present, silicone-coated fabrics are still used and their drawbacks are considerably improved. However, they are still insufficient.

Then, nowadays, woven fabrics to which no coating is applied, i.e., uncoated woven fabrics, are mainly used for air bags. Uncoated woven fabrics for air bags are required to have low air permeability. For this purpose, their production processes are generally divided into the following two processes.

One process (Process No. 1) is to weave a fabric on a loom tightly so that the number of warp yarns per inch and the number of weft yarns per inch are as dense as possible. In this process, laps of yarns should be constructed mechanically to prevent air leakage. Then, there is a problem of productivity because the load of the loom becomes too heavy, which makes it difficult to increase the speed at which the fabric is woven. In addition, since warp tension should be increased so as to increase the number of yarns per inch, the warp yarns are liable to be damaged, which results in a problem of reliability of mechanical properties of the resultant woven fabric.

In the other process (Process No. 2), as disclosed in JP-A 4-281062, a high density woven fabric is produced by using yarn having hot-air shrinkage of 6 to 15% (dry heat treatment at 160° C.), subjected to water-bath treatment at 60 to 160° C. and then subjected to drying without heat fixing. Indeed, this process is advantageous over Process No. 1 because the problem of mechanical properties of a woven fabric of Process No. 1 is not present and high density weaving is not required. However, regarding the drying step, this JP-A 4-281062 merely describes that the drying step "is carried out at 130 to 170° C. with a conventional machine" and it is silent on a particular kind of the dryer and drying conditions.

Moreover, in case of Process No. 1, for obtaining an uncoated woven fabric for air bags having low air-permeability, there are such problems as the decrease in productivity and damage of the warp yarns, i.e., less reliability of mechanical properties of the resultant fabric as described above.

In case of Process No. 2, when drying and finishing are carried out by a conventional dryer which is employed for a normal drying step, such as a cylinder dryer, shrink surfer dryer or a heat setter (tenter), insufficient pliability of a fabric after drying and wrinkling on the surface of a fabric due to rapid drying of the fabric are observed.

If a fabric lacks pliability, deployment of the air bag is not smooth, which results in rupture of a stress concentration part. Or, bad workability is caused in a step for turning an air bag inside out after sewing it, which requires much man-hour and is not desirable from the economical viewpoint. Moreover, regarding the above problem of wrinkling, when an air bag is deployed and stress concentration occurs at a wrinkled part, rupture of that wrinkled part of the air bag may be caused due to lowering of mechanical properties, for example, lowering of tear strength of that wrinkled part. This is a problem in view of protection of users.

OBJECTS OF THE INVENTION

One object of the present invention is to improve the above problems and drawbacks of known woven fabrics for air bags of motor vehicles such as improving the mechanical properties of woven fabrics, pliability of woven fabrics and surface wrinkling of woven fabrics, and the like.

Another object of the present invention is to provide an uncoated woven fabric for air bags of motor vehicles which is soft light weight, compact and economical, and has low air-permeability with maintaining mechanical properties required for a woven fabric for air hags.

These objects as well as other objects and advantages of the present invention will become apparent to those skilled in the art from the following description with reference to the accompanying drawings.

SUMMARY OF THE INVENTION

Figure 1:
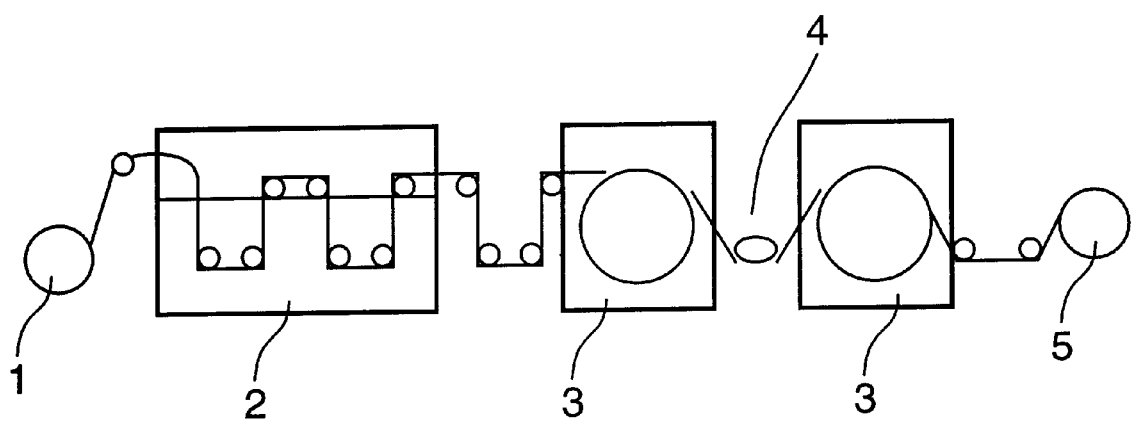
FIG. 1. is a schematic flow chart illustrating the production system of the present invention.

According to the present invention, there is provided:

1. An uncoated woven fabric for air bags which has the following properties:
   (a) ST5% (warp direction)+ST5% (weft direction)$\leq$1.2 g/d
   (b) AP$\leq$0.5 cc/cm$^2$/sec.
   (c) W$\leq$205 g/m$^2$
   (d) S (warp direction)+S (weft direction)$\leq$220 mm
   (e) T$\leq$0.30 mm wherein ST5% represents a value obtained by dividing tensile strength at 5% elongation of the fabric by total yarn denier of the fabric toward the elongation direction (g/d); AP represents the degree of air-permeability (frazir method, 125

Pa pressure difference) (cc/cm²/sec.); W represents weight of the fabric (g/m²); S represents the degree of stiffness (cantilever method) (mm); and T. represents a thickness of the fabric (mm);

2. A process for producing an uncoated woven fabric for air bags which comprises the steps of:
   (a) weaving a fabric;
   (b) subjecting the woven fabric to a shrinkage step in boiling water; and then
   (c) subjecting the woven fabric thus treated to a step for drying and finishing;

3. The process according to the above 2, wherein the step (c) is carried out with a suction drum dryer;

4. The process according to the above 3, wherein the step (c) is carried out by a multi-stage step;

5. The process according to the above 3, wherein the step (c) is carried out by a two-stage step, temperature of the first stage (T1) being 70 to 170° C. and temperature of the second stage (T2) being 90 to 190° C.;

6. The process according to the above 5, wherein T2 is higher than T1;

7. The process according to the above 6, wherein warp tension is controlled between the first stage and the second stage of the step (c);

8. The process according to the above 7, wherein warp tension is controlled during the step (b);

9. The process according to the above 8, wherein the step (a) is carried out by a water jet loom;

10. The process according to the above 8, wherein the fabric woven by a water let loom is subjected to the step (b) immediately without drying;

11. The process according to the above 8, wherein dry heat shrinkage of the raw yarn used is 5 to 12% (treatment at 180° C.×15 min.);

12. An uncoated woven fabric for air bags obtained by the process of any one of the above 2 to 11;

13. A system of producing an uncoated woven fabric for air bags which comprises:
   (a) a weaving mechanism;
   (b) a woven fabric shrinking mechanism in boiling water; and
   (c) a drying and finishing mechanism;

14. The system according to the above 13, wherein a suction drum dryer is included in the mechanism (c);

15. The system according to the above 14, wherein the mechanism (c) is a multi-stage mechanism;

16. The system according to the above 14, wherein the mechanism (c) is a two-stage mechanism;

17. The system according to the above 16, wherein the mechanism (c) includes two units and a warp tension controlling apparatus is included between the first unit and the second unit;

18. The system according to the above 17, wherein the mechanism (b) includes a warp tension controlling apparatus; and 19. The system according to the above 18, wherein the mechanism (a) includes a water jet loom.

DETAILED DESCRIPTION OF THE INVENTION

In one aspect, the present invention provides an uncoated woven fabric of air bags having the following properties:
   (a) ST5% (warp direction)+ST5% (weft direction)$\leq$1.2 g/d
   (b) AP$\leq$0.5 cc/cm²/sec.
   (c) W$\leq$205 g/m²
   (d) S (warp direction)+S (weft direction)$\leq$220 mm
   (e) T$\leq$0.30 mm wherein ST5% represents a value obtained by dividing tensile strength at 5% elongation of the fabric by total yarn denier of the fabric toward the elongation direction (g/d); AP represents the degree of air-permeability (frazir method, 125 Pa pressure difference) (cc/cm²/sec.); W represents weight of the fabric (g/m²); S represents the degree of stiffness (cantilever method) (mm); and T represents a thickness of the fabric (mm).

First, ST5% (warp direction)+ST5% (weft direction) of the uncoated woven fabric for air bags should be not more than 1.2 g/d. This requisite is of very high importance for energy absorption by a bag at the initial stage of deployment of the air bag. That is, when the sum of ST5% (warp direction) and ST5% (weft direction) is more than the above value and an air bag is unsuitably stored in a steering wheel, an instrument panel, a recess in the door frame, etc., a stress concentration may occur at a certain part upon acting high internal pressure on the air bag at the initial stage of deployment. Then, that part which has the stress concentration cannot sufficiently absorb the energy of the stress by its elongation, which results in rupture of that part and failure to protect a user.

Second, when AP is more than 0.5 cc/cm²/sec., gas leakage from the woven fabric upon deployment becomes too large, and the air bag does not function to protect a user.

Third, the factors that W is not more than 205 g/m², the sum of S (warp direction) and S (weft direction) is not more than 220 mm and T is not more than 0.30 mm are of very importance for providing the uncoated woven fabric for air bags which is light-weight, and excellent in compactness. When these values exceed the above ranges, respectively, it is difficult to obtain the uncoated woven fabric having sufficient thickness and weight upon folding, and desirable pliability. This is undesired because, nowadays, an air bag module tends to be miniaturized and therefore an air bag body should also be miniaturized.

Preferably, the uncoated woven fabric for air bags which satisfies the above properties can be produced by the production process and system of the present invention as described hereinafter. According to the production process and system of the present invention, the uncoated woven fabric for air bags, which has low air-permeability and is very soft and excellent in energy absorption at the initial stage of deployment, can be obtained by an economical production process with satisfying mechanical properties required for air bags.

Thus, in another aspect, the present invention provides a process for producing an uncoated woven fabric for air bags which comprises the steps of:
   (a) weaving a fabric;
   (b) subjecting the woven fabric to a shrinkage step in boiling water; and then
   (c) subjecting the woven fabric thus treated to a step for drying and finishing.

In the process of the present invention, the respective steps (a) to (c) can be carried out by per se known methods.

The process of the present invention is characterized in that, after weaving a fabric, first, it is subjected to the shrinkage step (b) and then the drying and finishing step (c). This can be carried out separately or continuously. For example, a woven fabric can be subjected to the shrinkage step, followed by passing it through a suction drum dryer in a separate step. Alternatively, a woven fabric treated in the shrinkage step is continuously subjected to the drying and finishing step. From the economical viewpoint, continuous treatment is preferred.

In the step (c), it is necessary to use a suction drum dryer because the costs for facilities is about 1/10 in comparison with other dryers as described above. Moreover, using a suction drum dryer, a lot of advantageous properties of the fabric can be obtained as described hereinafter.

The suction drum dryer used herein is a dryer device having a drum (e.g., rotary drum) which sucks hot air from outside through its drum peripheral wall to dry a woven fabric placed on the surface of the drum. Then, the drum peripheral wall should have air permeability such as a drum having mesh or slit structure.

In the present invention, the drying and finishing step (c) is preferably carried out by a multi-stage step to improve pliability of a woven fabric and to inhibit wrinkling. The more stage number, the more preferred. However, from the economical viewpoint such as facilities and costs, the step (c) is preferably carried out by a two-stage step. For example, the "two-stage step" for drying and finishing are carried out in the same dryer which is divided into two compartments so that temperature of the atmosphere in each compartment can be varied. Alternatively, drying and finishing can be carried out in independent systems by using separate units.

In the two-stage step, preferably, temperature of a suction drum dryer is adjusted so that temperature of the first stage (T1) is 70 to 170° C. and temperature of the second stage (T2) is 90 to 190° C., more preferably, T1 is 90 to 130° C. and T2 is 110 to 150° C. In addition, the drying and finishing conditions are adjusted so that T2 is higher than T1. Under these conditions of the step (c), the present inventors have succeeded in the production of the uncoated woven fabric for air bags of motor vehicles which has suitably adjusted air-permeability and is very soft and free from wrinkles, by an economical process with maintaining mechanical properties required for air bags.

When T1 is lower than 70° C., pre-drying effect is scarcely expected. On the other hand, when T1 is higher than 170° C., a fabric wrinkles due to rapid drying, which results in deterioration of the resultant woven fabric.

When T2 is lower than 90° C., the pre-dried woven fabric cannot be sufficiently heated. This affects long-term heat stability of the woven fabric. For example, this increases air-permeability after storage under the conditions at 120° C. for 400 hours, one of environmental aging tests of automobile manufactures, which also results in deterioration of the resultant woven fabric.

Further, it has been found that the above advantageous properties of the resultant woven fabric can be enhanced by adjusting T2–T1 to 5 to 40° C. That is, "T2–T1" is an important factor for determining whether a fabric can be used as the uncoated woven fabric for air bags having long-term stability after aging and can be produced without wrinkling.

Furthermore, in the process of the present invention-, it is preferred to control tension between dryers of respective multiple drying stages. That is, when drying is carried out by multiple stages, shrinkage of the woven fabric is caused in respective drying zones. Then, in order to minimize stress in the warp direction upon shrinkage of the fabric, it is required to adjust a drum peripheral speed so that the peripheral speed in a drying zone is faster than that of the next drying zone. Preferably, the drum peripheral speeds in successive drying zones are adjusted to keep warp tension of the fabric always constant, automatically. A shrinkage stress of the fabric can be occurred without any strain by controlling warp tension of the fabric like this. This is of very importance for giving pliability to the woven fabric and it has been found that this control of tension exhibits a great advantage in combination with the suction drum dryer.

Likewise, it is preferred to control warp tension in the shrinkage step in boiling water and this is also of very importance for improving shrinkage behavior of the woven fabric.

In still another aspect, the present invention provide a system of producing an uncoated woven fabric for uncoated air bags which comprises:

(a) a weaving mechanism;
(b) a woven fabric shrinking mechanism in boiling water; and
(c) a drying and finishing mechanism.

For example, as seen from the attached FIG. 1, the system of the present invention includes a weaving mechanism (not shown), a greige fabric roll 1, a boiling water bath 2 as the shrinking mechanism, two units such as dryers 3 and 3 for the drying and finishing mechanism, a warp tension controlling apparatus 4 such as a conventional tension control and a roll 5 of the resultant uncoated woven fabric. A greige fabric wound onto the roll 1 by a weaving mechanism (not shown) is passed through the bath 2 to subject the shrinkage step and then passed through the units 3 and 3. During passing through the units, warp tension of the fabric is controlled by the apparatus 4. Then, the resultant uncoated woven fabric for air bags is wound onto the roll 5.

As described above, necessarily, the dryer is a suction drum dryer and it is preferred to provide a mechanism for adjusting the drum peripheral speeds in successive drying zones to keep warp tension of the fabric always constant, automatically. The drying and finishing mechanism is not limited to the two-stage mechanism as shown by FIG. 1 and the stage number may be more than two.

An additional warp tension control apparatus can be provided in the bath 2.

The weaving mechanism to be used is not specifically limited to a specific one and may be a loom such as water jet loom, air jet loom, rapier loom, projectile loom and the like. In particular, in view of productivity of weaving, decrease in damage to yarn, and no requirement of size for the warp, a water jet loom or an air jet loom is particularly preferred. Further, in view of easy removal of the spin finish (oil) and the size on the warp used, a water jet loom is more preferred because almost all the spin finish can be readily removed by water during weaving and therefore a scouring process can be simplified. Then, it is preferred to a fabric woven by a water jet loom is passed through the boiling water bath 2 immediately without drying.

The yarn to be used for the uncoated woven fabric of the present invention is not specifically limited to a specific one. Preferred examples of the yarn includes those of synthetic fibers such as aliphatic polyamide fibers, in particular, nylon 66, nylon 6, nylon 46, nylon 12 and the like; aromatic polyamide fibers such as aramid fibers; and homopolyesters such as polyethylene terephthalate, polybutylene terephthalate, and the like. Other examples thereof include wholly aromatic polyesters, ultra-high molecular weight polyethylene fibers, PPS fibers, polyether ketone fibers, and the like. Among them, from the economical viewpoint, polyester fibers and polyamide fibers (nylon 66, nylon 46, nylon 6) are particularly preferred.

Further, in order to improve passage of production steps of yarn and post-processing steps, these synthetic fibers may contain various additives. Examples of additives include antioxidant, heat stabilizers, lubricants, antistatic agents, thickening agent, flame retardants, fire retardants and the like. Furthermore, a certain processing agent can be applied by dipping, etc. before drying.

For satisfying the mechanical properties required for woven fabrics for air bags, preferably, the yarn has such mechanical properties as breaking tenacity of 8.0 g/d or more, preferably 9.0 g/d or more, and linear density of 100 to 840 d, more preferably 210 to 420 d. In addition, preferably, dry heat shrinkage of the raw yarn used is 5 to 12% (treatment at 180° C.×15 min.).

The following Examples and Comparative Examples further illustrate the present invention in detail, but are not to be construed to limit the scope thereof. In the Examples and Comparative Examples, the physical properties were determined according to the following methods.

ST5%: JIS L1096 6.12 1. Method A (strip method). A specimen of 5 cm width, 20 cm clamping distance was. elongated at a stretching rate of 200 mm/min to determine strength at 5% elongation toward warp and weft direction, respectively. ST5% was calculated by dividing the strength thus determined by total denier of yarns toward the elongation direction.

Air-permeability: JIS L1096 6.27.1. Method A (frazir method)

Weight: JIS L1096 6.4.2.

Degree of stiffness: JIS L1096 6. 19. 1. Method A (cantilever method).

Thickness: JIS L1096 6.5. (under pressure of 240 g/cm$^2$)

Number of yarns per inch: JIS L1096 6.6.

Tensile strength: JIS L1096 6.12.1. Method A (strip method).

Weaving productivity: expressed by a relative value of the speed at which the fabric is woven.

Quality level of fabric: expressed by the state of wrinkling upon processing.

EXAMPLE 1

Nylon 66 filament yarn of 315 d/72 f having breaking tenacity of 9.6 g/d and dry heat shrinkage of 8.0% was used as the warp and weft and a plain woven fabric was woven by a water jet loom. The fabric, without drying, was passed through a boiling water bath and then passed through a suction drum dryer for carrying out a two-stage drying and finishing step under conditions at T1 of 110° C. and T2 of 130° C.

The physical properties of the resultant woven fabric are shown in Table 1.

EXAMPLE 2

Polyester filament yarn of 350 d/96 f having breaking tenacity of 9.2 g/d and dry heat shrinkage of 8.0% was used as the warp and weft and a plain woven fabric was woven by a water jet loom. The fabric, without drying, was passed through a boiling water bath and then passed through a suction drum dryer for carrying out a two-stage drying and finishing step under conditions at T1 of 130° C. and T2 The physical properties of the resultant woven fabric are shown in Table 1.

EXAMPLE 3

Nylon 66 filament yarn of 210 d/72 f having breaking tenacity of 9.6 g/d and dry heat shrinkage of 8.0% was used as the warp and weft and a plain woven fabric was woven by a water jet loom. The fabric, without drying, was passed through a boiling water bath and then passed through a suction drum dryer for carrying out a two-stage drying and finishing step under conditions at T1 of 130° C. and T2 of 150° C.

The physical properties of the resultant woven fabric are shown in Table 1.

EXAMPLE 4

Nylon 66 filament yarn of 315 d/72 f having breaking tenacity of 9.6 g/d and dry heat shrinkage of 8.0% was used as the warp and weft and a double woven fabric was woven by a rapier loom with a Jacquard machine. The fabric was passed through a boiling water bath and then passed through a suction drum dryer for carrying out a two-stage drying and finishing step under conditions at T1 of 130° C. and T2 of 150° C.

The physical properties of the resultant woven fabric are shown in Table 1.

COMPARATIVE EXAMPLE 1

Nylon 66 filament yarn of 315 d/72 f having breaking tenacity of 9.6 g/d and dry heat shrinkage of 8.0% was used as the warp and weft and a plain woven fabric was woven by a water jet loom. The fabric, without drying, was passed through a boiling water bath and then passed through a suction drum dryer for carrying out a two-stage drying and finishing step under conditions at T1 of 60° C. and T2 of 80° C.

The physical properties of the resultant woven fabric are shown in Table 2.

COMPARATIVE EXAMPLE 2

Nylon 66 filament yarn of 420 d/72 f having breaking tenacity of 9.6 g/d and dry heat shrinkage of 4.0% was used as the warp and weft and a plain woven fabric was woven by a water jet loom. The fabric, without drying, was passed through a boiling water bath and then subjected to finishing with a heat setter (tenter) at 180° C. by setting overfeed toward warp direction at 0% and that toward weft direction at a constant width.

The physical properties of the resultant woven fabric are shown in Table 2.

COMPARATIVE EXAMPLE 3

Nylon 66 filament yarn of 315 d/72 f having breaking tenacity of 9.6 g/d and dry heat shrinkage of 8.0% was used as the warp and weft and a plain woven fabric was woven by a water jet loom. The fabric, without drying, was passed through a boiling water bath and then passed through a cylinder dryer for carrying out drying and finishing at 150° C.

The physical properties of the resultant woven fabric are shown in Table 2.

COMPARATIVE EXAMPLE 4

Nylon 66 filament yarn of 315 d/72 f having breaking tenacity of 9.6 g/d and dry heat shrinkage of 8.0% was used as the warp and weft and a plain woven fabric was woven by a rapier loom with adding a warping oil agent. The fabric was passed through a boiling water bath and then passed through a shrink surfer dryer for carrying out drying and finishing step at 150° C.

The physical properties of the resultant woven fabric are shown in Table 2.

COMPARATIVE EXAMPLE 5

Nylon 66 filament yarn of 420 d/72 f having breaking tenacity of 9.6 g/d and dry heat shrinkage of 4.0% was used as the warp and weft and a plain woven fabric was woven by a water jet loom. The fabric, without drying, was passed through a boiling water bath and then subjected to drying and finishing with a heat setter (tenter) at 150° C. by setting overfeed toward warp direction at 3%.

The physical properties of the resultant woven fabric are shown in Table 2.

In Tables 1 and 2, the quality level of fabric is expressed by the following criteria:

A: suitable for air bags
B: could be used for air bags
C: unsuitable for air bags

TABLE 1

| Properties | Example | | | |
|---|---|---|---|---|
| | 1 | 2 | 3 | 4* |
| ST 5% (warp) + ST 5% (weft) (g/d) | 0.92 | 0.99 | 1.00 | 0.95 |
| AP (cc/cm²/s) Initial | 0.10 | 0.11 | 0.11 | 0.09 |
| After 120° C. × 400 hrs | 0.18 | 0.20 | 0.15 | 0.17 |
| W (g/m²) | 190 | 200 | 155 | 191 |
| S (warp) + S (weft) (mm) | 181 | 196 | 160 | 176 |
| T (mm) | 0.28 | 0.28 | 0.23 | 0.28 |
| Number of yarns per inch (threads/inch) | 63/61 | 63/61.5 | 74/74 | 63/61.5 |
| Tensile strength (N/cm) | 660/660 | 640/645 | 530/549 | 658/655 |
| Weaving productivity | 100 | 100 | 100 | 95 |
| Quality level | A | A | A | A |

*indicates the properties of one sheet of double woven fabric.

TABLE 2

| Properties | Comparative Example | | | | |
|---|---|---|---|---|---|
| | 1 | 2 | 3 | 4 | 5 |
| ST 5% (warp) + ST 5% (weft) (g/d) | 0.86 | 1.40 | 1.10 | 0.91 | 0.95 |
| AP (cc/cm²/s) Initial | 0.12 | 0.55 | 0.10 | 0.10 | 0.65 |
| After 120° C. × 400 hrs | 0.65 | 0.76 | 0.17 | 0.19 | 0.80 |
| W (g/m²) | 186 | 230 | 188 | 202 | 235 |
| S (warp) + S (weft) (mm) | 180 | 233 | 222 | 238 | 204 |
| T (mm) | 0.28 | 0.33 | 0.29 | 0.30 | 0.33 |
| Number of yarns per inch (threads/inch) | 62/60.5 | 55/55 | 63/62 | 66/60 | 55/55 |
| Tensile strength (N/cm) | 650/655 | 770/765 | 660/658 | 690/685 | 770/760 |
| Weaving productivity | 100 | 98 | 100 | 90 | 98 |
| Quality level | B | B | C | C | C |

(warp/weft)

As seen from Tables 1 and 2, although the initial value of air-permeability of Comparative Example 1 satisfies properties required for an uncoated woven fabric for air bags, the value after 120° C.×400 hrs is too high. This is unsuitable for an uncoated woven fabric for air bags.

In Comparative Example 2, energy absorption is problem and air permeability does not satisfy the required properties. In addition, it has undesirable weight and compactness. In Comparative Examples 3 and 4, the resultant woven fabrics lack pliability and have a problem of wrinkling because they are exposed to high temperature in the single stage step and a suction drum dryer is not used.

Air-permeability of Comparative Example 5 is too high to use as an uncoated woven fabric for air bags and undesirable.

As described hereinabove, according to the present invention, the uncoated woven fabric for air bags, which has suitably adjusted air-permeability and is free from the problem of a fabric quality level such as wrinkles and excellent in pliability, can be provided by an economical production process with satisfying mechanical properties required for air bags.

What is claimed is:

1. (Amended) An uncoated woven fabric for air bags which has the following properties:
    (a) ST5% (warp direction)+ST5% (weft direction)≦1.2 g/d
    (b) AP≦0.5 cc/cm²/sec.
    (c) W≦205 g/m²
    (d) S (warp direction)+S (weft direction)≦220 mm
    (e) T≦0.30mm wherein ST5% represents a value obtained by dividing tensile strength at 5% elongation of the fabric by total yarn denier of the fabric toward the elongation direction (g/d); AP represents the degree of air-permeability (frazir method, 125 Pa pressure difference) (cc/cm²/sec.); W represents weight of the fabric (g/m²); S represents the degree of stiffness (cantilever method) (mm); and T represents a thickness of the fabric (mm).

2. A process for producing an uncoated woven fabric for an air bag which comprises the steps of:
    (a) weaving a fabric;
    (b) subjecting the woven fabric to a shrinkage step in boiling water; and then
    (c) subjecting the woven fabric thus treated to a step for drying with a suction drum dryer and finishing, wherein the step (c) is carried out by a multi-stage step.

3. A process for producing an uncoated woven fabric for an air bag which comprises the steps of:
    (a) weaving a fabric;
    (b) subjecting the woven fabric to a shrinkage step in boiling water; and then (c) subjecting the woven fabric thus treated to a step for drying with a suction drum dryer and finishing, wherein the step (c) is carried out by a two-stage step, temperature of the first stage (T1) being 70 to 170° C. and temperature of the second stage (T2) being 90 to 190° C.

4. The process according to claim 3, therein T2 higher than T1.

5. The process according to claim 4, wherein warp tension is controlled between the first stage and the second stage of the step (c).

6. The process according to claim 5, wherein warp tension is controlled during the step (b).

7. The process according to claim 6, wherein the step (a) is carried out by a water jet loom.

8. The process according to claim 6, wherein the fabric woven by a water jet loom is subjected to the step (b) immediately without drying.

9. The process according to claim 6, wherein dry heat shrinkage of the raw yarn used is 5 to 12% (treatment at 180° C.×15 min.).

10. An uncoated woven fabric for air bags obtained by the process of any one of claims 4 to 9.

11. A system of producing an uncoated woven fabric for air bags which comprises:

(a) a weaving mechanism;

(b) a woven fabric shrinking mechanism in boiling water; and (c) a drying and finishing mechanism, wherein the mechanism (c) includes a suction drum dryer and is a multi-stage mechanism.

12. A system of producing an uncoated woven fabric for air bags which comprises:

(a) a weaving mechanism;

(b) a woven fabric shrinking mechanism in boiling water; and (c) a drying and finishing mechanism, wherein the mechanism (c) includes a suction drum dryer and is a two-stage mechanism.

13. The system according to claim 12, wherein the mechanism (c) includes two units and a warp tension controlling apparatus is included between the first unit and the second unit.

14. The system according to claim 13, wherein the mechanism (b) includes a warp tension controlling apparatus.

15. The system according to claim 14, herein the mechanism (a) includes a water jet loom.

* * * * *